Nov. 25, 1969     A. C. SANFORD     3,479,920
CONNECTOR PLATE
Filed Sept. 5, 1967     2 Sheets-Sheet 1
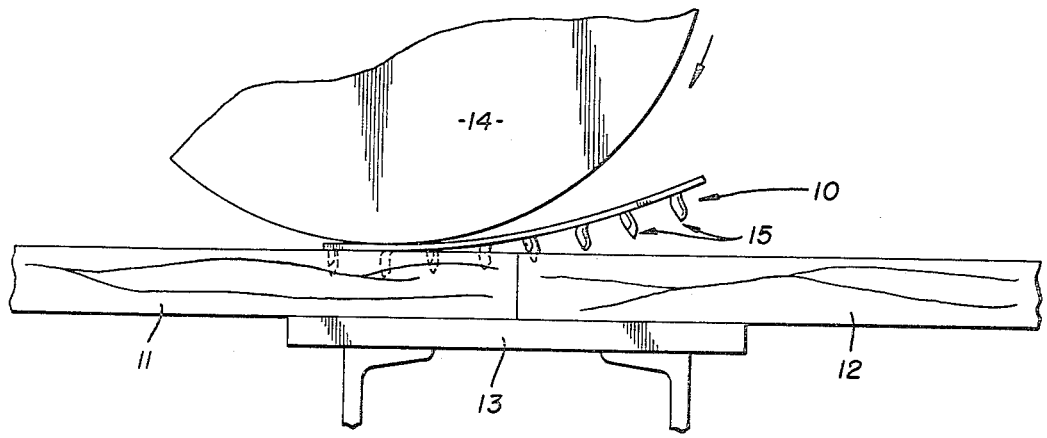
FIG. 1
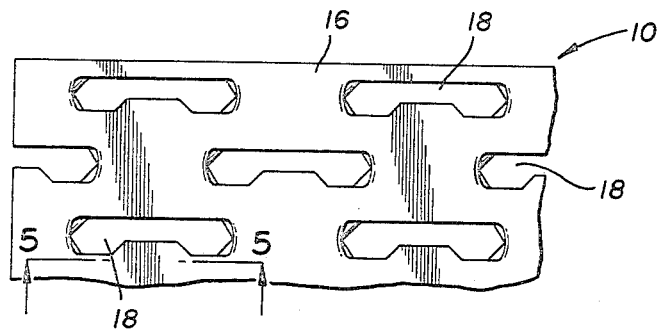
FIG. 2
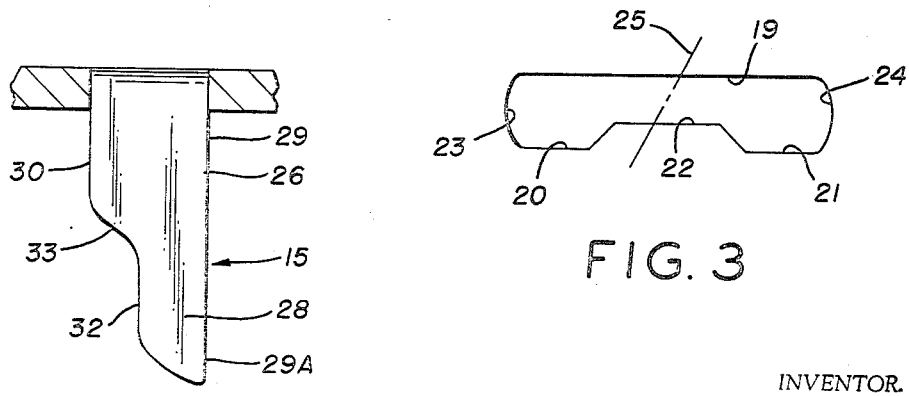
FIG. 3
FIG. 4
INVENTOR.
ARTHUR CAROL SANFORD
BY Hamilton & Cook
ATTORNEYS Nov. 25, 1969 — A. C. SANFORD — 3,479,920
CONNECTOR PLATE
Filed Sept. 5, 1967 — 2 Sheets-Sheet 2

INVENTOR.
ARTHUR CAROL SANFORD
BY Hamilton & Cook
ATTORNEYS

United States Patent Office 3,479,920
Patented Nov. 25, 1969

3,479,920
CONNECTOR PLATE
Arthur Carol Sanford, P.O. Box 1177,
Pompano Beach, Fla. 33061
Filed Sept. 5, 1967, Ser. No. 665,639
The portion of the term of the patent subsequent to
Apr. 16, 1985, has been disclaimed
Int. Cl. F16b 15/00
U.S. Cl. 85—13                               11 Claims

ABSTRACT OF THE DISCLOSURE

A metallic connector plate for joining wooden members. The teeth are punched in pairs from a common opening. Fundamentally, each tooth has a base portion and a tip portion with the tip portion being of substantially lesser width than the base portion. The opposed edges of each portion are formed from parallel sides of the opening in the plate from which each tooth is punched so that one edge of the tip portion is a continuation of one edge of the base portion. The teeth are contorted so that at least the tip portion lies in a preselected plane perpendicular to the plates.

BACKGROUND OF THE INVENTION

Tooth connector plates are particularly adapted for connecting wooden structural members. The strength of a joint connected by a connector plate is the result of several factors, including the strength of the plate itself and the strength of the engagement between the teeth and the wooden members into which they are embedded.

The strength of the plate itself includes both the tensile and shear strength. The tensile strength is the measure of the ability of the effective cross section of the plate to resist tensile forces. The shear strength of the plate is generally measured by the aggregate shear strength of the teeth, measured parallel to the plate at the roots of the teeth.

The strength of the engagement between the teeth and the wooden members is often termed the holding power of the teeth—i.e., the resistance offered by the teeth against extraction from the wooden structural members into which they are embedded. One measure of the holding power offered by a plate is the relation of the lineal penetration of the teeth into the wood per unit of area of the plate.

When one considers that connector plates are generally applied to both sides of a joint it is appreciated that the length of the teeth cannot be excessive, particularly when joining two-inch dimensional lumber. Moreover, because it has been found that plates are more economically applied to the wooden members by roller presses, as distinguished from punch presses, the length of the teeth should be kept minimal.

This suggests the necessity for increasing the number of teeth per unit area of the plate in order to supply the desired penetration. However, the greater the number of teeth, the more danger there is in splitting the wooden members, or at least severing sufficient of the wood fibers so that the effective strength of the structural members themselves falls below the effective strength of the connector plates used to join them.

Damage to the wooden members can, of course, be partially alleviated by reducing the size of the teeth and sharpening them. However, the reduction in the size of the tooth reduces its bending strength, tending to permit it to bend, or collapse, when subjected to the embedment pressures incident to applying the plate to the wooden structural members, and, while the sharpening of the teeth does facilitate entry thereof into the wood, sharpening the teeth has heretofore been found to be quite difficult, time consuming and costly.

At the same time, the manner of applying the connector plates must be considered. Considerably more pressure is required to apply connector plates to wooden members than can be readily exerted by a man with a hammer. Consequently, several ways of applying the connector plates have been devised, the most desirable employing a gantry roller which is passed across the top of the members to be joined to embed the teeth at least partially into the wood. An example of such a device is shown in my prior United States Patent No. 3,212,694.

As the roller contacts and moves across each connector plate, the plate tends to conform to the roller. That is, the plate tends to curl, or curve, upwardly, particularly at the end thereof in advance of the roller. Because of this tendency of the plate to conform to the arc of the roller, the teeth address the wood with a slight inclination so that, and particularly with slender teeth adapted not to cut the wood fibers excessively or split the wood, they can be quite easily bent before insertion.

Such bending, which can easily go undetected, prevents the full penetration of the teeth required to achieve their maximum holding power.

SUMMARY OF THE INVENTION

It is therefore an object of the present invention to provide a connector plate in which the teeth are capable of providing a satisfactory lineal penetration per unit area of the plate without splitting the wood or unnecessarily cutting the wood fibers and thereby adversely decreasing the effective strength of the structural members into which they are embedded.

It is another object of the present invention to provide a connector plate, as above, in which the teeth are specially effective against undesirable bending upon embedment.

These and other objects which will become apparent from the following specification are accomplished by means hereinafter described and claimed.

In general, a connector plate embodying the concept of the present invention has a plurality of openings aligned end to end with a pair of teeth extending outwardly of the plate from each opening, one at either end thereof. Each tooth has a base portion and a tip portion of substantially lesser width than the base portion. The openings from which each pair of teeth are punched have parallel sides such that the opposed edges of both the base and tip portions would be parallel and such that one edge of the tip portion would be a continuation of one edge of the base portion except that at least the tip portion of each tooth is contorted to lie in a preselected plane perpendicular to the plate itself.

One preferred embodiment of a plate embodying the concept of the present invention is shown by way of example in the accompanying drawings and hereinafter described in detail without attempting to show all of the various forms and modifications in which the invention might be embodied; the invention being measured by the appended claims and not the details of the specification.

DESCRIPTION OF THE DRAWINGS

FIG. 1 is a schematic side elevation of a plate embodying the concept of the present invention being pressed into two wooden structural members by a roller press;

FIG. 2 is a top plan view of a portion of a plate according to the present invention;

FIG. 3 is an enlarged schematic representation of an opening, as shown in FIG. 2, from which a pair of opposed teeth embodying the concept of the present invention are struck;

FIG. 4 is an enlarged schematic elevational profile of a tooth as it would be struck from the opening shown in FIG. 3 but not contorted;

DESCRIPTION OF THE PREFERRED EMBODIMENT

Figure 5:
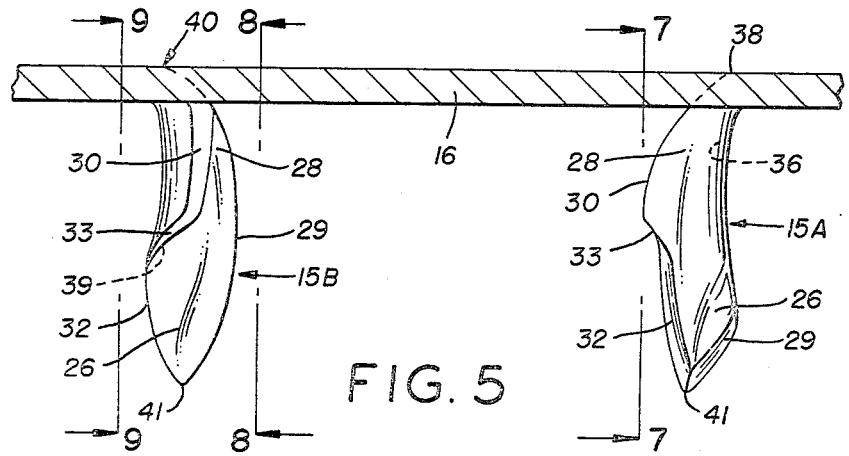
FIG. 5 is an enlarged cross section taken substantially on line 5—5 of FIG. 2 depicting, in side elevation, a pair of opposed teeth struck from an opening.

Referring more particularly to the drawings, a connector plate according to the present invention is designated generally by the numeral 10. In FIG. 1 the plate 10 is depicted as it is being pressed by a roller 14 into two wooden members 11 and 12 supported on a reaction pad 13.

The connector plate 10 has a plurality of teeth 15 which are struck, or punched, from the body portion 16 of the plate in opposed pairs out of openings 18. Each opening 18 (FIG. 3) has one continuous side 19 parallel with a discontinuous opposite side. The opposite side has two aligned sections 20 and 21 interrupted by a medial section 22 also parallel to side 19 but closer thereto than the sections 20 and 21.

The two teeth struck from each opening remain integral with the body portion 16 of the plate at the opposed ends 23 and 24 of the opening 18 and are separated from each other along a cleavage line 25. As such, the fundamental outline of each tooth is controlled by the shape of the opening from which it is struck. Each tooth 15 is fashioned from the opening 18 with a thickness generally equal to the thickness of the body portion 16 of the plate since it was struck therefrom. Each tooth 15 also has a base portion 26 and a tip portion 28 having a lesser width than the base portion, as is shown in the uncontorted representation of the tooth in FIG. 4.

The edges 29 and 30 on the base portion 26 of a typical tooth 15 are formed from the parallel sides 19 and 20. The tip portion 28 is integral with the base portion 26 with that edge 29A formed from side 19 of the opening 18 constituting a continuation of the edge 29 of the base. The second edge 32 of the tip portion 28 is formed from the medial section 22 of that side of the opening 18 opposite and parallel to, but closer than the sections 20 and 21 to side 19 so that the tip portion 28 has lesser width than the base portion 26.

The edges 30 and 32 are joined by a transitional shoulder 33. While the shoulder may be "squared off," that is, extend perpendicularly between edges 30 and 32, it is preferable, in view of the hereinafter described contortion of the teeth, that the shoulder 33 be inclined.

The preferred portions for the outline of the teeth 15, prior contortion, are also best shown in FIG. 4. From that figure it can be seen that the width of the base portion 26 is approximately one-third the length of the tooth, the width of the tip portion 28 is approximately one-half the width of the base portion 26, and the length of the base portion 26 is approximately one-half the length of the tooth. Applying these proportions to obtain dimensions for such an outline, a typical tooth three-eighths of an inch in length would have a base portion one-eighth of an inch in wdith and approximately three-sixteenths of an inch long, of which the transitional shoulder 33 would extend approximately one-sixteenth of an inch. The width of the tip portion 28 would be approximately one-sixteenth of an inch.

The teeth having the particular configuration described aforesaid have been found to process superb holding power and easy insertability and yet can be economically produced. However, the 16–22 gauge metal from which such connector plates are normally produced does not provide sufficient rigidity to assure maintenance of the tooth generally perpendicularly to the plate throughout its length when it is attempted fully to embed such a tooth by a single pass of a roller across the plate. The tendency of the plate to curl upwardly ahead of the roller, as shown in FIG. 1, presents the teeth on the curved portion of the plate angularly with respect to the surface of the wood into which they are to be forced. Once a tooth so inclined begins to penetrate the wood the tooth is blocked from freely returning to the proper vertical orientation. Accordingly a slender tooth such as that described above which provides an excellent tooth per plate area ratio will tend to bend transversely of its broadest dimension.

By contorting, or twisting, at least the tip portion 28 around the longitudinal axis of the tooth 15 it has been found that the tooth will not collapse even under pressure of the roller fully embedding the teeth in a single pass. The contortion of the tooth supplies not only columnar strength to the vulnerable small tip portion 26 but also stretches the edges of the tooth's tip portion 26 to a knife-like sharpness.

Referring to FIGS. 5–9, it will facilitate understanding to discuss the contortion of each tooth in the pair struck from opening 18.

The tooth 15A (FIGS. 5 and 7) of the pair 15A and 15B struck from opening 18 is dished concavely toward the opening 18—i.e., the concavity faces the opening—about a fold line 36 which defines the innermost extent of the concavity. The fold line extends from the medial portion of the tooth root, 38, outwardly of the tooth to intersect the continuous side 29 of the tooth approximately two-thirds the length of the tooth outwardly from the body portion 16 of the plate. As the tooth 15A is struck from the opening at least the tip portion 26 is contorted about the fold line 36 so that it lies in a pre-selected plane perpendicular to the body portion 16 of the connector plate 10.

The particular plane in which the tip portion 26 is chosen to lie is selected in view of the orientation of the connector plate with respect to the direction of movement of the roller 14; preferably the plane should lie transversely to the axis of the roller, that is, in line with the direction of the movement thereof.

As the tip portion 26 is contorted about fold line 36 the metal in the tooth is also stretched so that fold line 36 is oriented substantially perpendicularly to the plate in the completed tooth and thus becomes its longitudinal axis.

Figure 6:
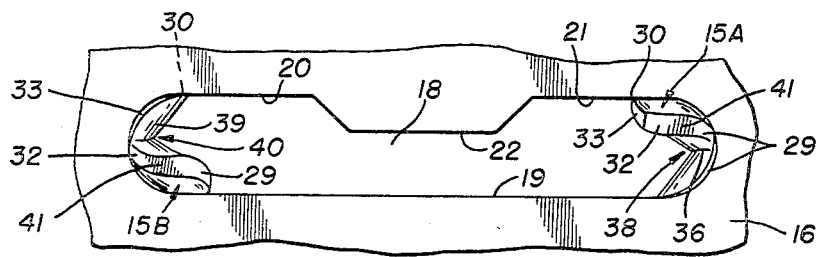
FIG. 6 is a bottom plan taken substantially on line 6—6 of FIG. 5.
Figure 9:
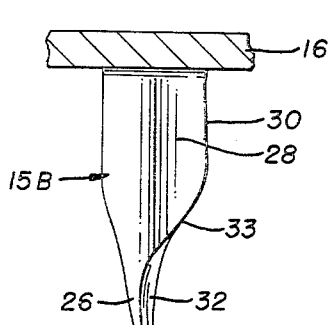
Figure 8:
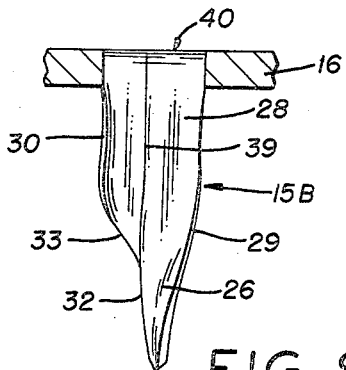
FIG. 8 is a view similar to FIG. 7 of the opposed tooth of the pair struck from a single opening, taken substantially on line 8—8 of FIG. 5; and, FIG. 9 is also an elevational representation, taken on line 9—9 of FIG. 5, to show the opposite side of the tooth depicted in FIG. 8.
Figure 7:
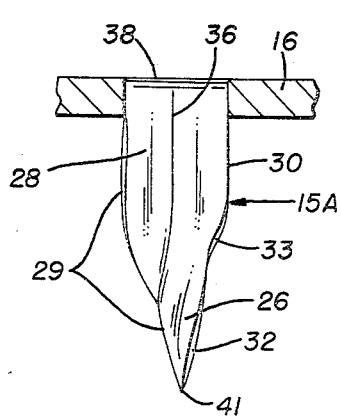
FIG. 7 is an elevational representation of one of an opposed pair of contorted teeth struck from a single opening, taken substantially on line 7—7 of FIG. 5.

When the openings 18 are aligned with the direction the roller is to travel, the optimum contortion of the teeth is approximately 90°. That is, at least the tip portion 26 of the teeth are contorted through almost 90° so as to be substantially aligned with the opening 18, as best seen in FIG. 6. The direction through which the tooth is contorted is determined by the opening 18—the tip portion 26 is always twisted so that the edge thereof most remote from the fold line 36 is moved toward the opening.

With tooth 15A, for example, the fold line 36 intersects the continuous side 29. Accordingly, the edge 32 of the tip portion 26 is most remote from the fold line 36 and is turned toward the opening 18.

The tip portion 26 of the tooth 15B (FIGS. 5, 8 and 9) is also contorted. However, the fold line 39 of the tooth 15B extends from the medial portion of this tooth root, at 40, outwardly of the tooth to intersect the side 32 of the tip portion as it joins the transitional shoulder 33. Thus, on tooth 15B the edge 29 is most remote from the fold line 39, and the edge 29 is turned toward the opening 18. The tip portion 26 of tooth 15A, then, would be contorted counterclockwise while the tip portion 26 of tooth 15B is contorted clockwise, as shown in FIG. 6. Nevertheless, the tip portions 26 of both teeth 15A and 15B lie in a preselected plane perpendicular to the body portion 16 of the plate and aligned generally with the direction the roller 14 is intended to pass.

By thus contorting the teeth 15A and 15B not only does the point 41 of each tooth remain needle sharp but the edges of the contorted section of the tooth are thereby drawn to a knife-like sharpness. Hence, as the contorted portion of the tooth contacts the wooden member it makes no difference whether the plate has been curled by the pressure of the roller or not. The sharpened edges of the tip portion will slice into the wood rather than catch on the fibers, and the bending strength of the tip portion is at its maximum inasmuch as the greatest dimension of the tip portion is now aligned with the direction of force application.

The base portion 28 of teeth 15A and 15B, though lying substantially transverse the direction of force application, is approximately twice as wide as the tip portion and is crimped along its corresponding fold line so that it too will have sufficient beam strength to withstand the deleterious lateral pressure applied as the roller 14 imbeds the teeth.

By punching pairs of teeth 15 from openings 18 which are longitudinally aligned and laterally staggered so that lateral alignment occurs between alternate rows (FIG. 2), a relatively large number of teeth can be provided with respect to the area of the plate. Moreover, these teeth not only provide the desired lineal penetration into the wood per unit area of the plate but also, because of their unique configuration, possess exceptional columnar and beam strength so that they will not bend or collapse under even the lateral stress imparted by a roller press embedding the teeth on a single pass. A connector plate embodying the concept of the present invention thus accomplishes the objects of the invention.

I claim:

1. A connector plate for joining wooden members, said plate having a plurality of openings from which conforming teeth are struck in opposed pairs, said openings having a continuous first side and a discontinuous second side formed by two aligned sections and interrupted by a medial section, the two aligned sections of said discontinuous side and said medial section being parallel to said first side, the medial section lying closer to said first side than the two aligned sections of said interrupted side, the opposed ends of said opening defined by the roots of a pair of opposed teeth integral with said plate and extending outwardly of said opening, each said tooth having a base portion formed between the continuous first side and one section of the discontinuous side and a tip portion formed between the continuous side and a portion of the medial section, said tip portions having at least one knife-like lateral edge, the width of said tip portion being substantially less than the width of said base portion, at least said tip portion being contorted to lie parallel to a preselected plane perpendicular to said plate.

2. A connector plate, as set forth in claim 1 in which a transitional surface extends between each said continuous section and said medial section of the opening and a transitional shoulder extends between the base and tip portions of that portion of each tooth formed by the transitional surface of said opening, a fold line extending from the root of one tooth in each pair to that side of the tooth formed by the continuous side of said opening approximately two-thirds of the length of the tooth outwardly of the plate, a fold line on the second tooth in each pair which extends from the root thereof to the juncture of said transitional shoulder with said tip portion, at least the tip portion of said tooth being contorted about said fold line toward said opening.

3. A connector plate, as set forth in claim 2, in which the tip portion is approximately one-half the width of the base portion and the width of the base portion is approximately one-third the length of the tooth.

4. A connector plate, as set forth in claim 3, in which the openings are aligned longitudinally and staggered laterally so that alternate rows are laterally aligned and in which at least the tip portion is contorted into substantial longitudinal alignment with the openings.

5. A connector plate for joining wooden members, said plate having a plurality of elongated openings each formed by a pair of opposing teeth standing from opposite ends thereof, each opening having a continuous lineal side and a discontinuous lineal side having two aligned end portions and a medial portion offset toward said continuous side, said portions being generally parallel to said continuous side, each tooth having a continuous side derived from the continuous side of an opening and an offset side derived from the other side thereof, said tooth sides forming a base and a substantially narrower tip, at least one side of said tip being knife-like, said tip being twisted about the longitudinal axis of the tooth to present said knife-like edge against the wooden member when said plate is applied thereto by a roller press rolling in the direction of the plane of said twisted tip.

6. A connector plate for joining wooden members, as in claim 5, in which one edge of said tip faces substantially in the direction of the tooth at the opposite end of said opening.

7. A connector plate, as set forth in claim 6, in which the twisted portions of the opposed teeth in each pair are twisted at opposite directions toward each other and in which the teeth in each pair are concavely dished about their respective longitudinal axes so that their concavities are facingly opposed.

8. A connector plate, as set forth in claim 7, in which the tip portion is approximately one-half the width of said base portion.

9. A connector plate, as set forth in claim 8, in which the openings from which the pairs of teeth are punched are aligned longitudinally and staggered laterally so that alternate rows are laterally aligned.

10. A connector plate, as set forth in claim 9, in which the width of the base portion is approximately one-third the length of the tooth and the length of the base portion being approximately one-half the length of the tooth.

11. A connector plate, as set forth in claim 10, in which at least the tip portions are so contorted as to align substantially longitudinally with the openings.

References Cited

UNITED STATES PATENTS

| 3,277,768 | 10/1966 | Templin et al. | 85—13 |
| 3,377,905 | 4/1968 | McAlpine | 85—13 |
| 1,520,026 | 12/1924 | Hugh. | |
| 3,347,126 | 10/1967 | Templin et al. | 85—13 |
| 3,364,805 | 1/1968 | Sandford | 85—13 |

FOREIGN PATENTS 414,303  6/1910  France.

RAMON S. BRITTS, Primary Examiner